US010293891B2

(12) United States Patent
Eide (10) Patent No.: US 10,293,891 B2
(45) Date of Patent: May 21, 2019

(54) HIGH PRESSURE SWIVEL SYSTEM FOR TURRET-MOORED VESSEL (71) Applicant: ONESUBSEA IP UK LIMITED, Houston, TX (US)

(72) Inventor: Jørgen Eide, Fana (NO)

(73) Assignee: OneSubsea IP UK Limited (GB)

( * ) Notice: Subject to any disclaimer, the term of this patent is extended or adjusted under 35 U.S.C. 154(b) by 687 days.

(21) Appl. No.: 14/874,912

(22) Filed: Oct. 5, 2015

(65) Prior Publication Data
US 2017/0096193 A1 Apr. 6, 2017

(51) Int. Cl.
B63B 22/02 (2006.01)
B63B 22/26 (2006.01)
F16L 17/06 (2006.01)
F16L 27/08 (2006.01)
F16J 15/00 (2006.01)
F16L 17/035 (2006.01)
F16L 17/10 (2006.01)
F16L 39/06 (2006.01)
(Continued)

(52) U.S. Cl.
CPC ............ B63B 22/021 (2013.01); B63B 22/26 (2013.01); F16J 15/006 (2013.01); F16L 17/035 (2013.01); F16L 17/06 (2013.01); F16L 17/10 (2013.01); F16L 27/0804 (2013.01); F16L 39/06 (2013.01); B63B 21/507 (2013.01); F16J 15/3236 (2013.01)

(58) Field of Classification Search
CPC .... F16J 15/3236; F16J 15/006; B63B 21/507; F16L 39/06; F16L 17/035; F16L 27/0824; F16L 27/0816
See application file for complete search history.

(56) References Cited

U.S. PATENT DOCUMENTS 3,351,360 A 11/1967 Faccou
4,647,076 A 3/1987 Pollack et al.
5,052,720 A 10/1991 Yoda
(Continued)

FOREIGN PATENT DOCUMENTS

WO 97/16674 A1 5/1997
WO 99/49177 A1 9/1999
WO 00/79174 A1 12/2000

OTHER PUBLICATIONS

International Preliminary Report on Patentability dated Apr. 10, 2018, for Application No. PCT/EP2016/067420 (8 pgs.).

Primary Examiner — David Bochna
(74) Attorney, Agent, or Firm — Conley Rose, P.C.

(57) ABSTRACT

A high pressure swivel system provides fluid communication on a turret-moored vessel between a swivel core member being in fixed rotational alignment with a seabed mooring system and a swivel revolving member being in fixed rotational alignment with the hull of the vessel. The revolving member has upper and lower radially extending surfaces. On each of the radially extending surfaces are a series of radially spaced apart pressure seals. Hydraulic barrier fluid pressure is regulated in each of the volumes formed between the pressure seals. The pressures in the volumes are regulated such that a process fluid pressure higher than could be tolerated by any one individual pressure seal is safely accommodated by sharing the high process fluid pressure between or among two or more of the radially spaced apart pressure seals.

11 Claims, 6 Drawing Sheets (51) Int. Cl.
*B63B 21/50* (2006.01)
*F16J 15/3236* (2016.01)

(56) References Cited

U.S. PATENT DOCUMENTS

| | | | |
|---|---|---|---|
| 5,702,130 A * | 12/1997 | Jostein | F16L 39/06 285/106 |
| 5,718,458 A | 2/1998 | Erstad | |
| 5,895,077 A | 4/1999 | Sigmundstad | |
| 6,053,787 A | 4/2000 | Erstad et al. | |
| 6,223,825 B1 | 5/2001 | Ingebrigtsen et al. | |
| 6,390,478 B1 | 5/2002 | Sigmundstad | |
| 6,450,546 B1 | 9/2002 | Montgomery et al. | |
| 6,578,603 B1 * | 6/2003 | Ødegaard | F16L 39/06 285/190 |
| 6,869,325 B1 | 3/2005 | Askestad | |
| 6,926,084 B2 | 8/2005 | Erstad | |
| 8,297,623 B2 | 10/2012 | Ødegaard | |
| 8,814,220 B2 | 8/2014 | Pollack | |
| 2012/0279979 A1 | 11/2012 | Huldt et al. | |

* cited by examiner

FIG. 6

HIGH PRESSURE SWIVEL SYSTEM FOR TURRET-MOORED VESSEL

TECHNICAL FIELD

The present disclosure relates to fluids handling equipment for floating vessels used in the offshore oil and gas industry. More particularly, the present disclosure relates to high pressure swivels used with turret-moored floating production, storage and/or offloading vessels.

BACKGROUND

In the offshore oil and gas industry, large floating vessels, such as a floating production, storage and offloading (FPSO) vessel or a floating storage and offloading (FSO) vessels, are used to receive produced hydrocarbons from subsea wells or manifolds or from nearby platforms or other subsea equipment, process them (in the case of an FPSO vessel), and store them until the oil and/or gas can be offloaded onto a tanker or other equipment. The FPSO/FSO vessel can be moored using a turret mooring system in which a fixed turret column is held by an internal or external vessel structure using a bearing arrangement. The vessel-bound components can weathervane freely around the turret, which is fixed via a number of anchor lines with respect to the seabed. This arrangement allows the FSO/FPSO vessel to adopt the direction of least resistance against waves, wind, and currents.

A turret-moored FPSO/FSO vessel makes use of swivels to allow for the transfer of fluids across the rotary-turret interface while the vessel weathervanes around the turret. Conventional, large diameter swivels have been limited in their pressure capacity i.e. the pressure differential or difference between pressures of the process fluid and the ambient environment up to a maximum of about 600 bars. It is desirable to provide swivel systems that can be used with higher pressure process fluids.

SUMMARY

This summary is provided to introduce a selection of concepts that are further described below in the detailed description. This summary is not intended to identify key or essential features of the claimed subject matter, nor is it intended to alter or limit the scope of the claimed subject matter.

A high pressure swivel system for a turret-moored vessel is described. The system includes a core member defining a central axis and capable of transferring high pressure process fluid between subsea and vessel while remaining in fixed rotational alignment with a seabed mooring system. The system also includes a revolving member, having upper and lower sealing faces extending radially away from the axis and high pressure fluid ports in communication with the process fluid, capable of revolving about the axis while remaining in fixed rotational alignment with the hull of the vessel. The system also includes: upper and lower fixed members, having sealing faces extending radially away from the axis, capable of remaining in fixed rotational alignment with the mooring system; multiple upper pressure seals spaced at different radii from the axis between the upper fixed member and revolving member; multiple lower pressure seals spaced at different radii from the axis between the lower fixed member and revolving member; and a hydraulic barrier fluid supply system to supply pressurized barrier fluid to volumes between the pressure seals for distribution of process fluid pressure among at least two pressure seals, thereby allowing process fluid pressure to safely exceed the operating limits of individual seals.

A method of providing process fluid communication on a turret-moored vessel between a swivel core member in fixed rotational alignment with a seabed mooring system and a swivel revolving member in fixed rotational alignment with the hull of the vessel and revolving about a central axis of the core member is also described. The method includes regulating hydraulic barrier fluid pressure in first and second volumes between at least three pressure seals extending radially along the revolving member such that the process fluid pressure is distributed among at least two of the pressure seals, thereby allowing the process fluid pressure to safely exceed the operating limits of the pressure seals.

BRIEF DESCRIPTION OF THE DRAWINGS

The subject disclosure is further described in the detailed description which follows, in reference to the following drawings of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness. Like reference numbers and designations in the various drawings indicate like elements.

DETAILED DESCRIPTION

The present disclosure relates generally to systems and methods for a high pressure swivel for use with a turret-moored vessel.

One or more specific embodiments of the present disclosure will be described below. The particulars shown herein are by way of example, and for purposes of illustrative discussion of the embodiments of the subject disclosure only, and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are used in an open-ended fashion, and thus should be interpreted to mean "including, but not limited to . . . " Also, any use of any form of the terms "connect," "engage," "couple," "attach," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Figure 1:
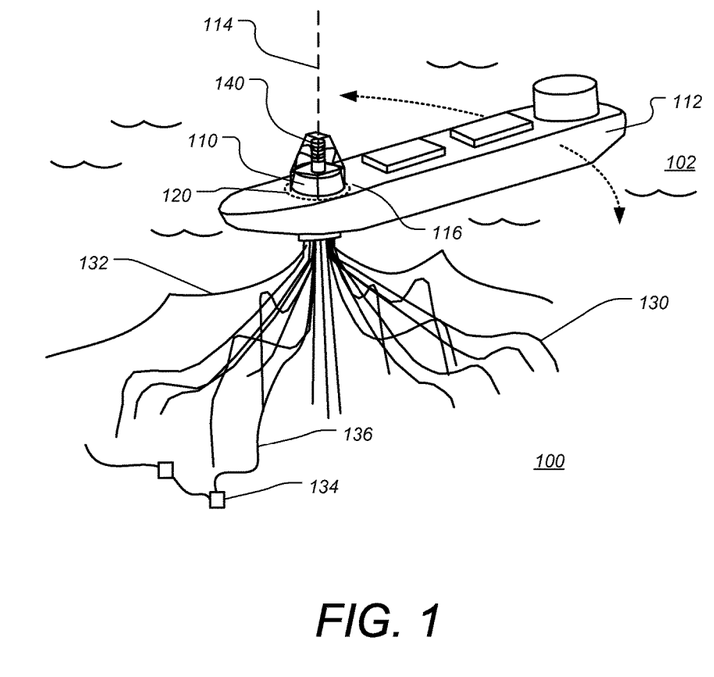
FIG. 1 is a diagram illustrating a vessel supporting a turret using a high pressure swivel system according to one of more aspects of the present disclosure.

FIG. 1 is a diagram illustrating a vessel supporting a turret using a high pressure swivel system, according to some embodiments. Vessel 112 is shown on the surface of seawater 102. According to some examples, vessel 112 is a floating production, storage and offloading (FPSO) vessel configured to receive hydrocarbons produced from subsea subterranean reservoirs, to processing and/or store the received hydrocarbons. Vessel 112 includes a rotatable turret 110 and a vessel structure 116 that surrounds the turret 110. A turret bearing system 120 is provided to support rotatable turret 110 on vessel 112 so as to allow the vessel 112 to weathervane 360° in either direction around vertical turret axis 114, as shown by the dotted arrows. Risers 130 and the anchor chains 132 of the mooring system are locked to the lower part of turret 110. Thus in operation turret 110 is in "fixed" rotational alignment with the mooring system and therefore also with the sea bed, while the hull of the vessel 112 and surrounding vessel structure 116 are able to rotate about turret axis 114.

Stacked above the turret system are one or more high pressure swivel(s) 140 through which high pressure fluid can pass between the vessel and the risers or other fluid conduits without twisting the risers and conduits. The swivel(s) 140 include an inner core that is fixed with the turret (and the mooring system) and a plurality of rotatable collars or rings.

Figure 2:
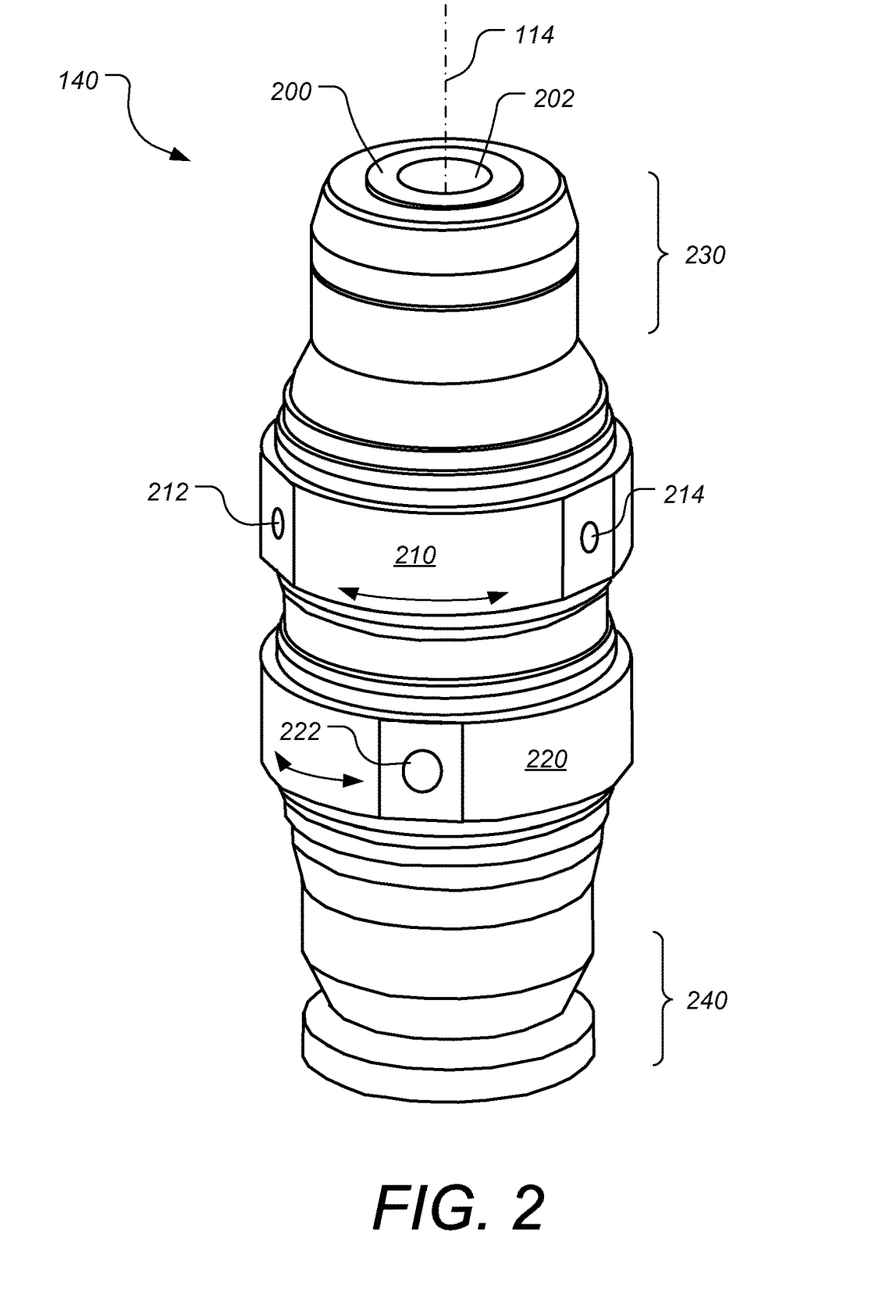
FIG. 2 is a perspective view of a high pressure swivel system according to one or more aspects of additional embodiments of the present disclosure.

According to some embodiments, rotating turret 110 is also used to supply an umbilical 136 that may include for example electric and/or hydraulic lines (not shown) to a subsea system 134 which can be, for example, a subsea pump and/or compressor. Although an FPSO vessel 112 is shown in FIGS. 1 and 2, the embodiments described herein are equally applicable to an FSO vessel or other vessel used for similar purpose. Also, although vessel 112 is shown in FIG. 1 with an internally mounted turret, the embodiments described herein are equally applicable to other types of turret mountings including external turret mountings.

According to some embodiments, the swivel system of the present disclosure can tolerate process pressures that far exceed the safety limits for each of the individual pressure seals used, which can be between 500 and 600 bar. In one example the process pressure may reach 15,000 psi or 1035 bar. At these pressure levels, very high axial and radial forces are created in normal operation. In some cases even higher pressures and forces can be used during operation and/or during pressure testing of the swivel system of the present disclosure.

FIG. 2 is a perspective view of a high pressure swivel system 140 according to some embodiments of the present disclosure. High pressure swivel system 140 is shown in this example with two outlet rings 210 and 220 that revolve about the central longitudinal axis 114 (also the turret axis in FIG. 1) as shown by the double tipped arrows. Each of the outlet rings 210 and 220 has a number of outlet ports of which ports 212, 214, and 222 are visible in FIG. 2. According to some embodiments, each outlet ring has three outlet ports, although this number can change upward or downward depending on the particular application. The outlet ports are in fluid communication with fluid conduits within swivel core 200. A central conduit 202 is visible in FIG. 2, although other conduits can also be included within core 200, with different conduits being fluidly connected to different outlet rings. In the example shown in FIG. 2, the outlet rings as well as bearing rings and other supporting rings (to be described below) are held together axially by an upper threaded nut 230 and a lower threaded nut 240. Although threaded engagement of components is shown, components such as for example rings also may be engaged or held together axially by other means (e.g., the upper or lower threaded nut 230, 240 may also be a solid part of the core 200).

Figure 3:
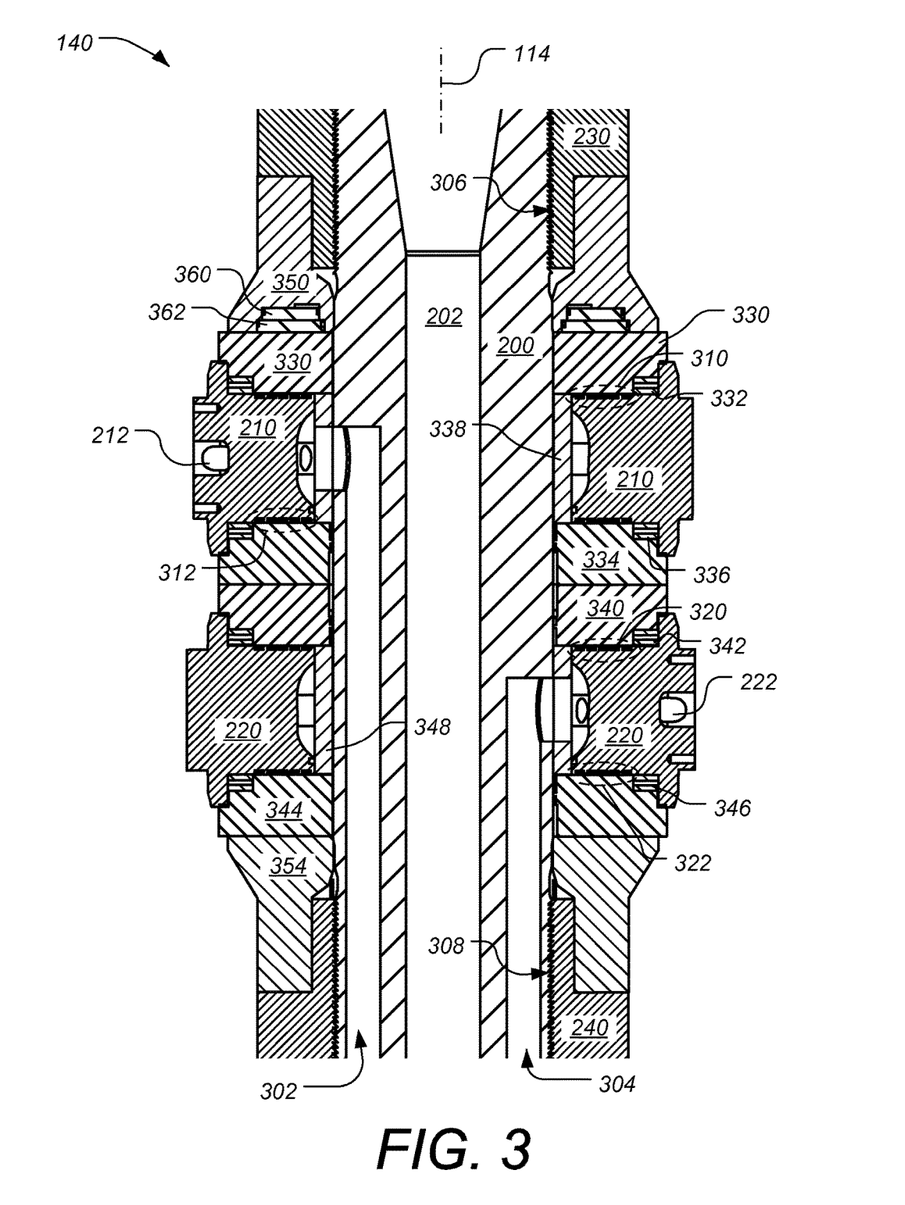
FIG. 3 is a cross sectional view of a high pressure swivel system according to one or more aspects of additional embodiments of the present disclosure.

FIG. 3 is a cross sectional view of a high-pressure swivel system 140 according to some embodiments of the present disclosure. Visible in FIG. 3 is the central swivel core 200 that is fixed rotationally with the mooring system. The core 200 includes several fluid conduits of which central fluid conduit 202 and annular fluid conduits 302 and 304 are visible. In this example, conduit 302 is in fluid communication with outlet ports on outlet ring 210 including visible outlet port 212, and conduit 304 is in fluid communication with outlet ports on outlet ring 220 including visible outlet port 222. The fluid communication may be achieved via lateral holes, bores, or conduits in core 200, through intermediate rings 338 and 348, and within the outlet rings 210 and 220. According to some embodiments, a total of six annular fluid conduits are bored into core 200 (of which only conduits 302 and 304 are visible in FIG. 3), with three of the six conduits being equally spaced within core 200 and in fluid communication with aligned holes in intermediate ring 338 or intermediate ring 348. The total number annular fluid conduits, the number of conduits in fluid communication with each intermediate ring, and the relative spacing of the conduits each or all may be varied depending upon the specifics of a project. For example, these aspects may be varied based on the types and flow volumes of fluid being transferred and/or any number of other project-specific factors.

The rotational movement of outlet ring 210 with respect to core 200 is provided by roller bearings 332 and 336, which are supported by bearing rings 330 and 334. Similarly, rotational movement of outlet ring 220 with respect to core 200 is provided by roller bearings 342 and 346, which are supported by bearing rings 340 and 344. In the arrangement shown, the two outlet rings 210 and 220 are free to revolve about the axis 114 while the core 200, intermediate rings 338 and 348, and bearing rings 330, 334, 340 and 344 are all in a fixed relationship with each other and are also in a fixed rotational alignment with the mooring system. Upper and lower horizontal, radially extending interfaces between the outlet rings and bearing rings are each sealed with a series of pressure seals. In particular, pressure seals 310 and 312 are used to seal outlet ring 210 and pressure seals 320 and 322 are used to seal outlet ring 220.

The bearing rings and outlet rings are held together in the axial direction by supporting rings 350 and 354, and upper and lower threaded nuts 230 and 240. In operation, due to the radial orientation of the pressure seals 310, 312, 320 and 322 and other factors, very high fluid pressures cause very large axial forces to be created. Additionally, temperature changes for example from high process fluid temperatures can cause substantial changes in the axial dimensions of the various components. Hydraulic pistons 360 and 362 are provided to balance the axial pressures and to accommodate such dimensional changes. For example, during process pressure ramp-up, pistons 360 and 362 are used to gradually counteract the increasing axial forces generated by the seals 310, 312, 320 and 322. To further strengthen the supporting structures for counteracting the large axial forces, according to some embodiments the upper and lower threaded nuts 230 and 240 may use buttress threads 306 and 308 respectively, which have significantly larger tooth base (shear area) than conventional trapezoidal threads.

Figure 4:
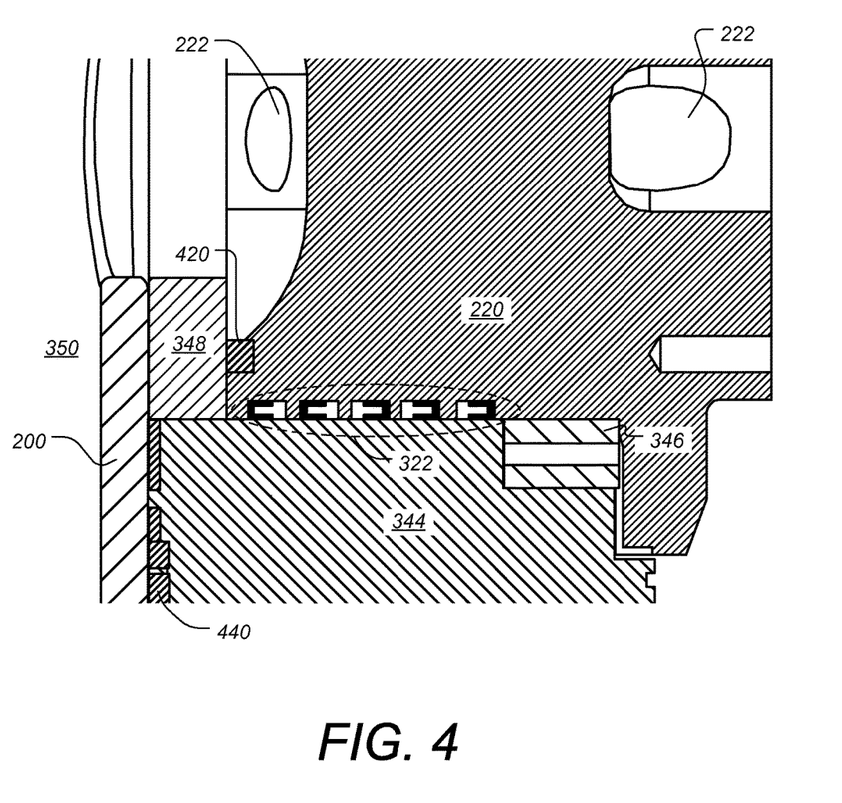
FIG. 4 is a cross section illustrating further detail of a series of radially-spaced pressure seals used in a high pressure swivel system, according to one or more aspects of additional embodiments of the present disclosure.

FIG. 4 is a cross section illustrating further detail of a series of radially-spaced dynamic pressure seals 322 and axially-spaced static pressure seals 440 used in a high pressure swivel system according to some embodiments of the present disclosure. Note that as shown in FIG. 4, bearing ring 344 remains static with respect to core body 200, so the seals 440, which may vary in shape and/or in number, are static seals. Also visible in FIG. 4 is a dirt scraper ring 420, which may be used to aid in preventing particulate matter from entering seals 322, roller bearing 346, and outlet ring 220. Dynamic pressure seals 322 are shown in FIG. 4 as including five individual pressure seals, but more or fewer pressure seals may be used. According to some embodiments the other pressure seals 310, 312 and 320 may be similar or identical to pressure seals 322.

Figure 5:
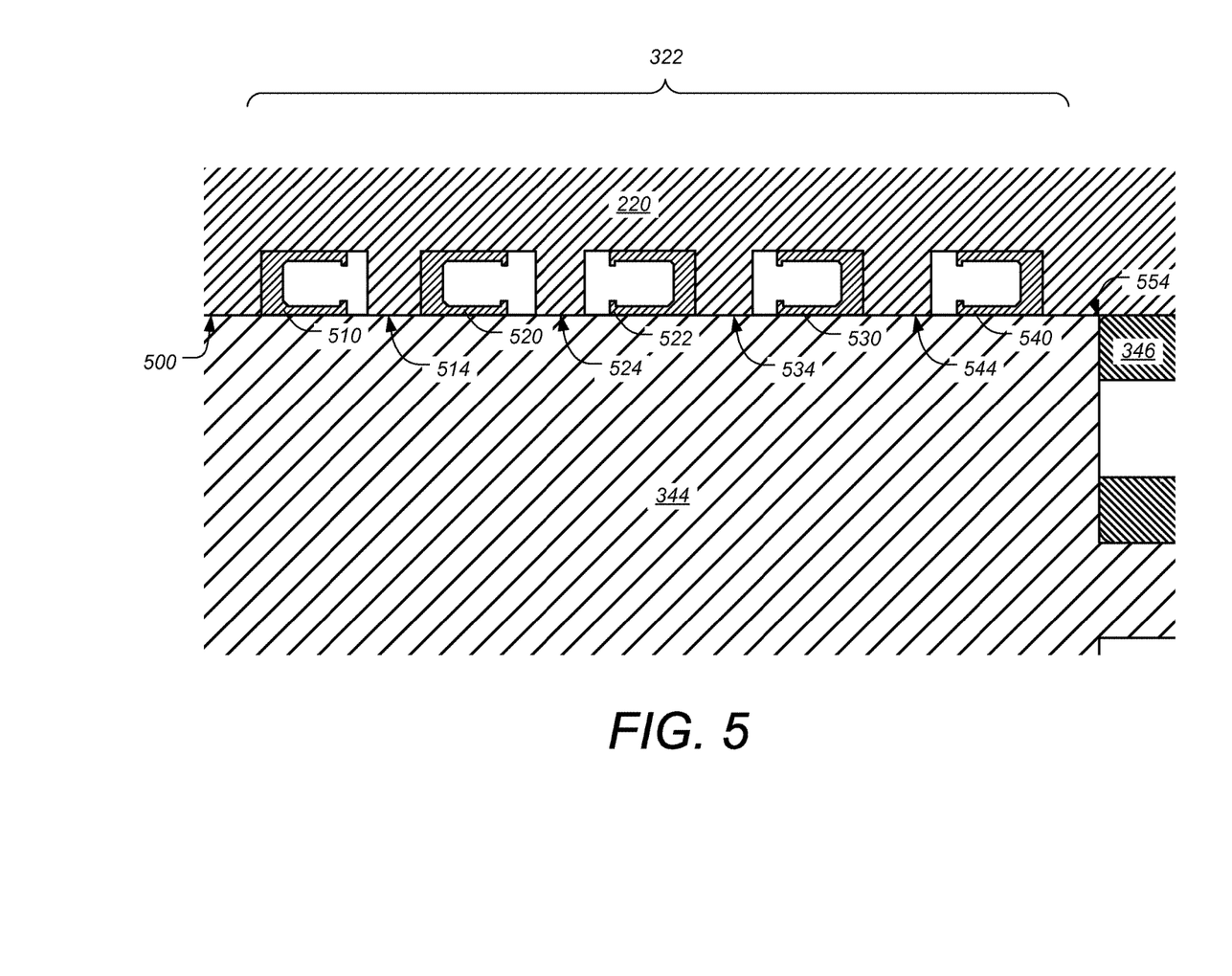
FIG. 5 is a cross section illustrating further detail of a series of radially-spaced pressure seals used in a high pressure swivel system, according to one or more aspects of additional embodiments of the present disclosure.

FIG. 5 is a cross section illustrating further detail of a series of radially-spaced pressure seals used in a high pressure swivel system, according to some embodiments of the present disclosure. In the example shown, pressure seals 322 may include a series of radially spaced apart pressure seals such as 510, 520, 522, 530, and 540. According to some embodiments, the first two pressure seals 510 and 520 can be configured to maintain a higher pressure on the outer sides (i.e. higher pressure on the sides of the seal furthest from the central swivel axis), while the other pressure seals 522, 530 and 540 can be configured to maintain a higher pressure on the inner sides (i.e. higher pressure on the sides of the seal closest to the central swivel axis). According to some embodiments, the pressure seals 520 and 522 are conceptualized as a single seal such that seal 510 is a "primary seal," seals 520 and 522 make up a "second seal" or "secondary seal," seal 530 is a "third seal," and seal 540 is a "fourth seal," for example. Further, according to some embodiments, in normal operation the pressure within the secondary seal (i.e. location 524 between seals 520 and 522) may be configured to be higher than either the process fluid pressure at location 500 or the ambient pressure. According to some embodiments, the pressure at location 514 may be configured to be maintained at an intermediate pressure between the process fluid pressure at location 500 and the secondary seal pressure at location 524. According to some embodiments, the pressure at location 534 (i.e. between secondary seal 522 and third seal 530) may be configured to be maintained at an intermediate pressure between the secondary seal pressure at location 524 and the pressure at location 544. In normal operation according to some embodiments, the fourth seal 540 may provide an extra pressure seal which can be used in cases when another pressure seal has failed. In such cases the normal operating pressure of location 544 may be configured to be at or near the ambient pressure.

Figure 6:
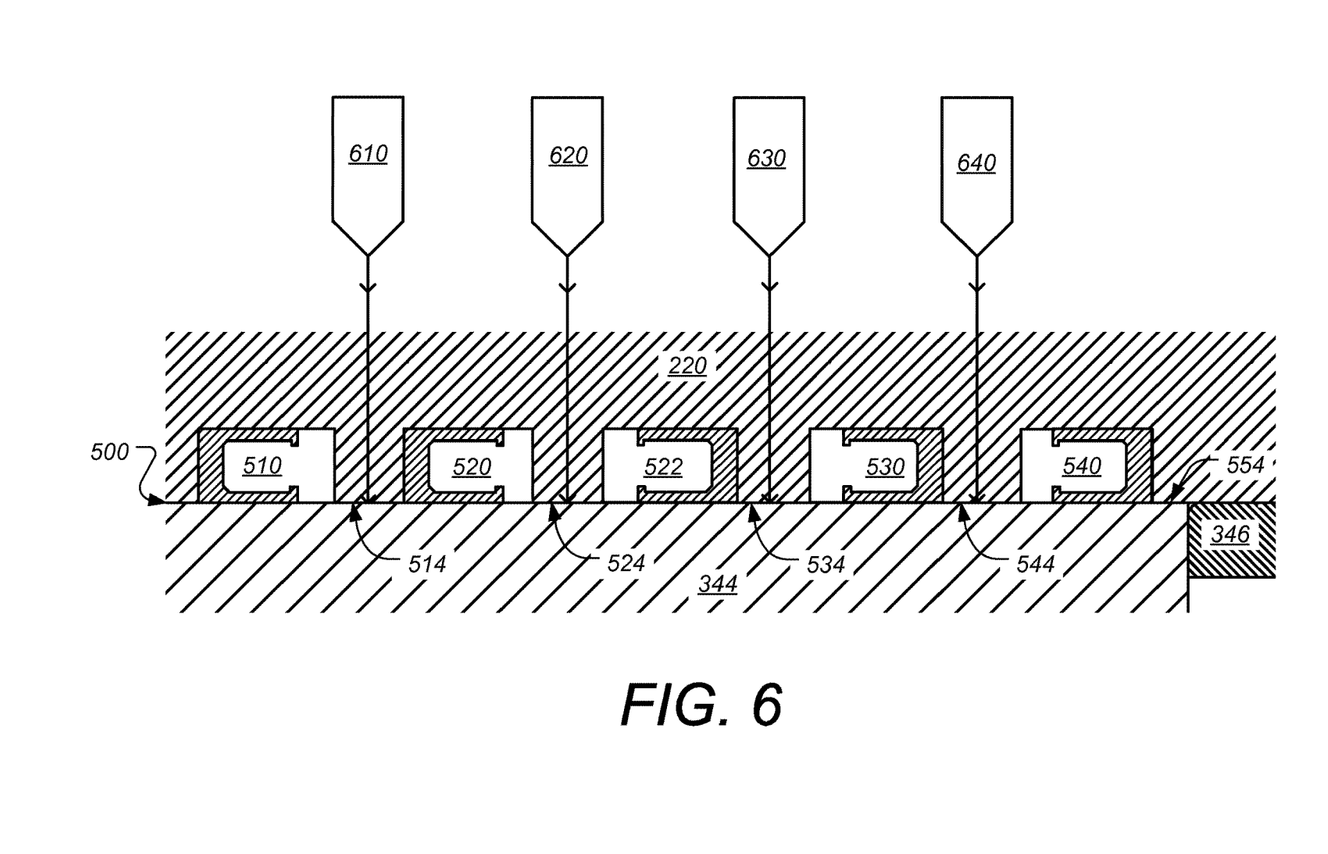
FIG. 6 is a cross section illustrating further detail of hydraulic fluid supply to a series of radially-spaced pressure seals used in a high pressure swivel system, according to one or more aspects of additional embodiments of the present disclosure.

FIG. 6 is a cross section illustrating further detail of hydraulic fluid supply to a series of radially-spaced pressure seals used in a high pressure swivel system, according to some embodiments of the present disclosure. According to some embodiments, the differential pressure across each of the barrier pressure seals 510, 520, 522, 530 and 540 is regulated by a control system (not shown) which monitors, supplies, and dumps or releases hydraulic barrier fluid. The barrier fluid may be oil or another hydraulic fluid of little to no compressibility. The process pressure in location 500 (or elsewhere in the system) is continuously measured. The control system regulates the differential pressures across each barrier pressure seal by either dumping fluid via one or more dump valves, or supplying fluid via one or more pumps and/or supply valves. In FIG. 6 barrier fluid supply systems 610, 620, 630 and 640 are shown which supply barrier fluid to location 514, 524, 534, and 544, respectively. One or more pumps are controlled so as to start on a minimum pressure and to stop at a maximum pressure.

According to some embodiments, the entire range of operating process pressures is divided into several distinct ranges or steps. For example, a process pressure range from 0 to 1035 bar can be divided into two or more steps. In this example the range is divided into three steps: (1) below 345 bar; (2) between 345 and 690 bar; and (3) between 690 and 1035 bar. In such cases each of the systems 610, 620, 630 and 640 can have a number of pressure regulating valves that corresponds to the number of steps, with each separate regulating valve being set according to a predetermined pressure level for that location. In the example with three steps, each system 610, 620, 630 and 640 has three pressure regulating valves. At any one time, two of the pressure regulating valves for a particular location are isolated, for example, using normally-closed actuated valves. When a change in pressure is needed to transition between steps, the control system operates the actuator for the appropriate pressure regulating valve. In the case of lowering pressure, the surplus barrier fluid is released or dumped back into a storage tank or to a closed drain. After a pressure is reached that is appropriate for the particular step and location, the control system closes the actuated valve, and regulates the pump according to the step-prescribed pressure. According to some embodiments, the pressures are all regulated with the same control system and at the same time such that the pressure differences between the pressure seals are maintained in accordance with the prescribed step. When moving to a higher pressure, a similar procedure is performed.

The pumps may be started for all of the locations at the same time. According to some embodiments, accumulators are used to smooth out pressure pulses and surges, for example, in applications where the supply pressure will vary quite often. Accumulators can be pre-charged with gas such that optimum operation is within a limited pressure band above the pre-charge pressure. In the case of applications with high process pressures, the pre-charge pressures in the accumulators will also need to be set quite high. The pressure can be regulated either continuously or stepwise. When using a step-wise pressure regulation scheme, each accumulator can be pre-charged for a specific step pressure. At any one time, only the accumulator that corresponds to the current step is used while the other accumulators for that location are disconnected.

Table 1 shows an example of barrier fluid pressure levels for a step-wise control system during normal operation for a process fluid pressure ranging from 0 to 1035 bar, according to some embodiments. The Primary, Secondary (or Second), Third and Fourth pressures can correspond to pressures at locations 514, 524, 534 and 544 as regulated by the systems 610, 620, 630 and 640 shown in FIG. 6.

TABLE 1

Example of Normal Operation

| Process Fluid (bar) | Primary ⊂ | Secondary ⊂ ⊃ | Third ⊃ | Fourth ⊃ |
|---|---|---|---|---|
| 690-1035 | 1055 | 1075 | 540 | 0 |
| 345-690 | 710 | 730 | 365 | 0 |
| 0-345 | 365 | 385 | 195 | 0 |

In the example shown in FIG. 6, barrier fluid supply systems 610, 620, 630 and 640 can include a total eight supply lines and either four or eight return lines. Use of multiple lines provides redundancy in the form of a backup supply for each location. For further detail relating to monitoring and control of barrier fluid supply to pressure seals for swivels, see co-owned U.S. Pat. No. 8,297,623, which is incorporated by reference herein in its entirety.

According to some embodiments, the high pressure swivel system of the present disclosure is fault tolerant such that it can continue operation even if one or more of the pressure seals does not maintain pressure. Tables 2-5 illustrate exemplary pressure levels for several fault mode scenarios. In particular, Table 2 shows an example of pressure levels in the case where the primary seal (e.g. seal 510) is damaged. In this case the inner-most secondary seal (e.g. seal 520) takes over the primary seal's function. Tables 3 and 4 show examples when either the inner or outer secondary seal (e.g. seal 520 or 522) is damaged. For example, if the inner secondary seal (e.g. seal 520) is damaged, then the primary seal (e.g. seal 510) and the third seal (e.g. seal 530) may take over. If both of the secondary seals are damaged, the third seal (e.g. seal 530) takes over the secondary seals' function, and the fourth seal (e.g. seal 540) takes over third seal's function. Table 5 shows an example when the third seal (e.g. seal 530) is damaged. If both a secondary seal and the third seal are damaged, the fourth seal (e.g. seal 540) takes over the third seal's function, and (as discussed above with regard to Tables 3 and 4) the primary seal takes over the secondary seal's function. If both the primary seal (e.g. seal 510) and the two secondary seals (e.g. seals 520 and 522) are damaged, then the pressure between the second and third seals (e.g. location 630) is increased to 1075 bar (e.g. using the secondary barrier system supply 620), and the location between the third and fourth seal (e.g. location 544) is increased to 540 bar (e.g. using the third barrier system supply 640). According to some embodiments, the switch over between the barrier fluid supply systems 610, 620, 630 and 640 is performed using two three-way valves being synchronously actuated by the control system.

TABLE 2

Example of Primary Seal Failure

| Process | Primary ⊂ | Second ⊂ ⊃ | Third ⊃ | Fourth ⊃ |
|---|---|---|---|---|
| 690-1035 | 1035 | 1075 | 540 | 0 |
| 345-690 | 690 | 730 | 365 | 0 |
| 0-345 | 345 | 385 | 195 | 0 |

TABLE 3

Example of Inner Secondary Seal Failure

| Process | Primary ⊂ | Second ⊂ ⊃ | Third ⊃ | Fourth ⊃ |
|---|---|---|---|---|
| 690-1035 | 1075 | 1075 | 540 | 0 |
| 345-690 | 730 | 730 | 365 | 0 |
| 0-345 | 385 | 385 | 195 | 0 |

TABLE 4

Example of Outer Secondary OD Seal Failure

| Process | Primary ⊂ | Second ⊂ ⊃ | Third ⊃ | Fourth ⊃ |
|---|---|---|---|---|
| 690-1035 | 1055 | 1075 | 1075 | 540 |
| 345-690 | 710 | 730 | 730 | 365 |
| 0-345 | 365 | 385 | 385 | 195 |

TABLE 5

Example of Third Seal Failure

| Process | Primary ⊂ | Second ⊂ ⊃ | Third ⊃ | Fourth ⊃ |
|---|---|---|---|---|
| 690-1035 | 1055 | 1075 | 540 | 540 |
| 345-690 | 710 | 730 | 365 | 365 |
| 0-345 | 365 | 385 | 195 | 195 |

According to some embodiments, all four barrier fluid supply systems 610, 620, 630 and 640 have a drain in order to be able to bleed off barrier fluid to reduce the pressure and volume of the barrier fluid. In addition, barrier fluid flow from a higher pressure location to a lower pressure location may also be controlled via active bleed-off. According to some embodiments, an environmental seal can be used between the last pressure seal (e.g. seal 540) and the roller bearing (e.g. roller bearing 346) to direct the barrier fluid away from the bearing grease. According to some embodiments, the barrier fluid bleed off is located inside the hose/check valve on the swivel stack, which makes use of one or more regulating valves located within the swivel stack.

While the subject disclosure is described through the above embodiments, modifications to and variations of the illustrated embodiments may be made without departing from the concepts herein disclosed. These and other variations and modifications will become apparent to those skilled in the art once the above disclosure is fully appreciated. It is intended that the following claims be interpreted to embrace all such variations and modifications.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A high pressure swivel system for a turret-moored vessel comprising:
a central core member extending axially along a central longitudinal axis, adapted to transfer a high pressure process fluid between a subsea location and the vessel, the core member configured to remain in a fixed rotational alignment with a seabed mooring system;
a revolving member having upper and lower revolving member sealing faces extending radially away from the axis, the revolving member having a high pressure fluid port in fluid communication with the process fluid in the core member and configured to revolve about the axis with respect to the core so as to remain in a fixed rotational alignment with a hull of the vessel;
upper and lower fixed members each having a fixed sealing face extending radially away from the axis and being configured to remain in fixed rotational alignment with the mooring system;
a plurality of upper pressure seals spaced at different radii from the axis, each upper pressure seal configured to form a pressure seal between the fixed sealing face of the upper fixed member and the upper sealing face of the revolving member;
a plurality of lower pressure seals spaced at different radii from the axis, each lower pressure seal configured to form a pressure seal between the fixed sealing face of the lower fixed member and the lower sealing face of the revolving member; and
a hydraulic barrier fluid supply system configured to supply a pressurized barrier fluid to volumes defined between each of the upper pressure seals and to volumes defined between each of the lower pressure seals such that a pressure of the process fluid is distributed among at least two pressure seals, thereby allowing the pressure of the process fluid to safely exceed operating limits for each of the upper and lower pressure seals;
wherein the plurality of upper pressure seals comprise a primary seal, a secondary seal comprising a pair of adjacent pressure seals and a volume formed between the adjacent pressure seals, and a third seal;
wherein the hydraulic barrier fluid supply system is configured to supply the volume of the secondary seal with barrier fluid having a pressure greater than a pressure of barrier fluid provided by the hydraulic barrier fluid supply system to a volume formed between the primary seal and the secondary seal and a volume formed between the secondary seal and the third seal.

2. The system of claim 1 wherein the hydraulic barrier fluid supply system is further configured to supply the pressurized barrier fluid such that at least one of the volumes between the upper pressure seals and at least one of the volumes between the lower pressure seals is greater than the pressure of the process fluid.

3. The system of claim 1 wherein the plurality of upper seals and the plurality of lower seals each include at least four pressure seals.

4. The system of claim 3 wherein the plurality of upper seals and the plurality of lower seals each include at least five pressure seals.

5. The system of claim 1 wherein forces in an axial direction between said revolving member and said upper and lower fixed members are at least partially counteracted by a lower flange member of the core member and an upper member engaged with an upper portion of the core member.

6. The system of claim 1 wherein forces in an axial direction between said revolving member and said upper and lower fixed members are at least partially counteracted by a lower member engaged with a lower portion of the core member and an upper member engaged with an upper portion of the core member.

7. The system of claim 1 wherein forces in an axial direction between said revolving member and said upper and lower fixed members are at least partially counteracted by a hydraulic piston.

8. The system of claim 1 wherein the hydraulic barrier fluid supply system is further configured to maintain a fixed pressure differential across one or more of the plurality of upper pressure seals or one or more of the plurality of lower pressure seals throughout a range of process fluid pressures.

9. The system of claim 1 wherein the hydraulic barrier fluid supply system is further configured to maintain fluid pressure levels in each of said volumes according to a predetermined step-wise control scheme in which a range of process fluid pressures is divided into a plurality of pressure range steps.

10. The system of claim 1 wherein the plurality of upper pressure seals, the plurality of lower pressure seals, and the hydraulic barrier fluid supply system are configured to continue safe operation in the event one of the pressure seals is damaged by redistributing the process fluid pressure to two or more un-damaged pressure seals.

11. The system of claim 1 wherein each of the upper pressure seals is located at a first axial position and each of the lower pressure seals is located at a second axial position.

* * * * *